(12) United States Patent
Kinstler

(10) Patent No.: US 8,451,860 B2
(45) Date of Patent: May 28, 2013

(54) LOW-WEIGHT HYBRID DETERMINISTIC HIGHSPEED DATA BUS

(75) Inventor: Gary A. Kinstler, Torrance, CA (US)

(73) Assignee: The Boeing Company, Chicago, IL (US)

( * ) Notice: Subject to any disclaimer, the term of this patent is extended or adjusted under 35 U.S.C. 154(b) by 953 days.

(21) Appl. No.: 11/672,628

(22) Filed: Feb. 8, 2007

(65) Prior Publication Data
US 2008/0192772 A1    Aug. 14, 2008

(51) Int. Cl.
*H04J 3/22* (2006.01)

(52) U.S. Cl.
USPC ............................................. 370/468

(58) Field of Classification Search
USPC ................................. 370/252, 468
See application file for complete search history.

(56) References Cited

U.S. PATENT DOCUMENTS

| | | | | |
|---|---|---|---|---|
| 6,529,984 B1 * | 3/2003 | Teener et al. | | 710/240 |
| 6,654,353 B1 * | 11/2003 | Tokura et al. | | 370/254 |
| 6,754,210 B1 * | 6/2004 | Ofek | | 370/389 |
| 6,831,926 B1 * | 12/2004 | Kinstler | | 370/467 |
| 7,180,904 B2 * | 2/2007 | Gaedeken et al. | | 370/442 |
| 7,346,010 B2 * | 3/2008 | Kinstler | | 370/257 |
| 2004/0086000 A1 * | 5/2004 | Wallace et al. | | 370/503 |
| 2004/0230752 A1 * | 11/2004 | Blake et al. | | 711/147 |
| 2005/0065669 A1 * | 3/2005 | Roux et al. | | 701/3 |

OTHER PUBLICATIONS

Bisson, K.; Troshynski, T., "Switched Ethernet testing for avionics applications," AUTOTESTCON 2003. IEEE Systems Readiness Technology Conference. Proceedings , vol., no., pp. 546-550, Sep. 22-25, 2003.*

* cited by examiner

*Primary Examiner* — Mark Rinehart
*Assistant Examiner* — Mohammad Anwar
(74) *Attorney, Agent, or Firm* — Caven & Aghevli LLC

(57) ABSTRACT

Switchless deterministic data bus networks and interfaces are disclosed. In one embodiment, a network includes a switchless shared bandwidth data bus; a plurality of nodes in communication with the shared bandwidth data bus; and a deterministic transport layer hosted on each node of the plurality of nodes, the deterministic transport layer providing message scheduling and flow control, the message scheduling using a bandwidth allocation and physical layer prioritization access protocol for scheduling a packet. An embodiment of an interface includes a packager that packages data received from the host processor into packets compatible with a switchless shared bandwidth network; an un-packager that un-packs data packets received from the network, removes payload data, and transmits the payload data to the host processor; and a deterministic bus scheduler and controller that controls and schedules the transmission of data over the switchless shared bandwidth network such that the network is a deterministic network.

23 Claims, 4 Drawing Sheets

LOW-WEIGHT HYBRID DETERMINISTIC HIGHSPEED DATA BUS

BACKGROUND

1. Technical Field

Embodiments of the disclosure relate to data bus protocols, and more particularly to implementations of a deterministic protocol on a shared data bus where nodes on the data bus have a pre-negotiated protocol for message scheduling.

2. Description of the Related Art

Avionics Full-Duplex Switched Ethernet (AFDX) is defined in the Aeronautical Radio, Incorporated (ARINC) standard ARINC 664—Part 7. This standard defines how Commercial Off-the-Shelf (COTS) networking technology will be used for future generation Aircraft Data Networks (ADN). AFDX defines a low-level network and protocol to communicate between end systems in aircraft. AFDX is based on Ethernet, however, AFDX also extends standard Ethernet to provide high data integrity and deterministic timing. Determinism is defined as controlling the maximum transmission delay through the network. One enabler of such control is precisely controlling the bandwidth allocation. Thus a deterministic network or a network operating with deterministic timing, controls the bandwidth allocation so that each node in the network can transmit a predetermined amount of data within a predetermined maximum time period. The ARINC 664 specification is herein incorporated by reference.

AFDX (also known as ARINC 664) is essentially a switch-based network solution to the point-to-point wiring of the Aeronautical Radio, Incorporated (ARINC) standard ARINC 429. Implementing the older ARINC 429 standard, dedicated wires directly connect individual end systems (source or destination nodes) to one another, with a separate wire pair required for each direction, and with both directions operating at a relatively slow maximum data rate. In contrast to ARINC 429, AFDX utilizes a single high data rate bidirectional connection to a centrally located switch to/from each source and destination node comprising the system network. In addition data to/from each end system is time division multiplexed over one physical path (wire pair or photonic connection) in each direction to/from the switch. These differences for ARINC 664 dramatically reduce the wiring required compared to ARINC 429 and offer faster speed. The ARINC 429 specification is herein incorporated by reference.

Thus, ARINC 664 requires switches to interconnect end systems. These switches take up space, require electrical power and add weight. Additional weight may be added by sizing the electrical power generation & distribution system (EPGDS) to support the additional power required by the switches.

Space-based vehicles are especially sensitive to weight and power requirements for network buses. Weight impacts for systems used in space applications arise from three sources:
1) the physical weight of the components (i.e., the switch weight);
2) the network interconnect topology affects wire weight; and
3) the power required to run the network infrastructure (i.e., switches) affects the size/weight of the electrical power generation & distribution system (EPGDS) at ~0.8 lbs/watt of power consumed.

The Institute of Electrical and Electronics Engineers, Inc. (IEEE) standard IEEE 802.3 defines wired Ethernet. 100Base-T Ethernet (100 Mbps) or Gb Ethernet (1 Gbps) can be configured as a switch-less shared bus network using carrier sense multiple access with collision detection (CSMA/CD) similar to the original coaxial cable Ethernet networks. Unlike switched Ethernet or AFDX networks, CSMA/CD networks cannot guarantee that a message would be transmitted within a predetermined time. The IEEE 802.3 specification is herein incorporated by reference.

The Institute of Electrical and Electronics Engineers, Inc. (IEEE) standard IEEE 1394 defines a serial bus interface that offers high-speed communications and time dependent, guaranteed throughput (isochronous) real-time data services. IEEE 1394, with the help of software can be used to create a shared bus network (i.e., a network without switches or routers). Request For Comments (RFC) Internet standards memoranda document RFC 2734 specifies how to run Internet Protocol, Version 4 (IPv4) over IEEE 1394 and RFC 3146 specifies how to run Internet Protocol, Version 6 (IPv6) over IEEE 1394. Both RFC 2734 and 3146 require using the asynchronous stream mode of data transfer. However, IPv4 and IPv6 do not provide any measure of latency control. Rather, they provide a guaranteed delivery class of service, with handshakes and acknowledgments for each complete transaction. Thus, neither RFC 2734 nor 3146 provide for a deterministic (time dependent with guaranteed throughput) network or data bus. The IEEE 1394, RFC 2734, and RFC 3146 specifications are incorporated herein by reference.

The IEEE 1394 standard includes IEEE 1394a (400 Mbits/s and IEEE 1394b (800 Mbits/s). IEEE 1394b added a new arbitration scheme. For data to be sent or received optimally, the 1394 devices must determine the order and timing of the transmission of data from each of the devices. In IEEE 1394b the data transmission now is continuous dual simplex; one copper-wire pair or photonic cable strand is continuously transmitting data in each direction (one for data, one for next bus access negotiation) thus resulting in a much simpler and more efficient data transmission process than IEEE 1394a.

The dual simplex nature of the IEEE 1394b bus architecture allows for the implementation of the highly efficient bus arbitration scheme, known as BOSS (Bus Owner Supervisor Selector) which implements simultaneous, pipelined arbitration so that the arbitration protocol runs in parallel with data transmissions. The IEEE 1394a (legacy version) is different in the sense that it alternates between data transmission and arbitration. The arbitration is dependant on the use of short or long time gaps of specified lengths to signal bus availability for various packet types in 1394a. As a result of this dependency there is a delay before a device wins an arbitration and is allowed to start sending its data. But, with the BOSS scheme, the currently transmitting node (device termed as the "Boss") decides which node gets to transmit next at the end of its transmission. When the Boss is finished transmitting, it knows where to send the grant. This immediate decision process saves the arbitration time, thus removing the need for arbitration time gaps.

IEEE 1394 supports three transfer modes: asynchronous, asynchronous stream and isochronous transfer. In the asynchronous transfer mode, data is guaranteed to be delivered without error to the receiver, where in case there are some disturbances in the bus, the data is sent again. The receiving node hardware will send an acknowledgement as to whether or not that the packet was received correctly. Thus, asynchronous transactions are deemed "guaranteed delivery", though no latency limit, or bandwidth, is guaranteed. Asynchronous messages are transmitted after completing all competing isochronous message traffic based on arbitration until the end of each repeating 125 uSec cycle.

Isochronous message packets are transmitted in a broadcast fashion and do not require or accommodate acknowledgements from individual recipients. They are thus not considered to provide guaranteed knowledge of delivery. Because of their priority over asynchronous messages, they provide instead a guaranteed bandwidth.

The last message type, called "asynchronous streaming", is similar to isochronous packets in that it does not require or accommodate receipt messages from individual recipients but that it may also be transmitted in any portion of the repeating 125 uSec cycles. It therefore provides guaranteed bandwidth, but not guaranteed delivery, to individual recipients. While asynchronous streaming packets provide guaranteed bandwidth once the sending device has access to the bus, there is no guarantee that a device with asynchronous streaming packets will be able to access the bus in a predetermined time.

The SAE standard AS5643 (MIL-1394) also defines a serial bus interface that offers high-speed communications. MIL-1394 is a military version of IEEE 1394. MIL-1394 provides for using time division multiple access (TDMA) to form a shared bus network. A MIL-1394 TDMA network is controlled at the application layer (i.e., the assignment of time slots to each end system is controlled by a software application at one or more nodes). However, MIL-1394 does not take advantage of the BOSS (described later) function in IEEE 1394b. Furthermore, MIL-1394 requires a more complicated management of time slots to provide latency control. AFDX, with BAG groups, is easier to schedule and use. The SAE standard AS5643 (MIL-1394) is herein incorporated by reference.

Accordingly, there is a need for a switchless deterministic shared bus network that minimizes weight and power while providing deterministic data transport.

SUMMARY

Embodiments of the disclosure may advantageously address the problems identified above by providing, in one embodiment, a deterministic shared bus network that minimizes power and weight impacts to the host vehicle, particularly space vehicles that may be most sensitive to weight and power requirements, while leveraging other protocols and available development infrastructure typically used for heavier data bus types.

Some embodiments may provide the advantages of deterministic data transport provided by AFDX with the weight savings of a shared bus network.

One embodiment provides a network that includes a dual switchless shared bandwidth data bus; a plurality of nodes in communication with said dual shared bandwidth data bus; and a deterministic transport layer hosted on each node of said plurality of nodes, the deterministic transport layer providing message scheduling and flow control, the message scheduling using a pre-negotiated protocol for scheduling a message packet.

In one embodiment the interface includes a packager that packages data received from the host processor into packets compatible with a switchless shared bandwidth network; an un-packager that un-packs data packets received from the switchless shared bandwidth network, removes payload data, and transmits the payload data to the host processor; and a deterministic bus scheduler and controller that controls and schedules the transmission of data over the switchless shared bandwidth network such that the network is a deterministic network.

BRIEF DESCRIPTION OF THE DRAWINGS

The accompanying drawings incorporated in and forming part of the specification illustrate several embodiments of the disclosure. In the drawings.

Reference will now be made in detail to embodiments of the disclosure, examples of which are illustrated in the accompanying drawings.

DETAILED DESCRIPTION

One embodiment provides the advantages of the deterministic network, (e.g., the guarantee of sufficient bandwidth over a predetermined time to transmit a message of a predetermined size (one of the features of the transport/transaction layer portion of the AFDX/ARINC 664-Part 7 data bus network)) with the advantages of a shared bandwidth data bus (e.g., lower weight and power). A deterministic network ensures that each node in the network has a predetermined minimum amount of bandwidth available to be able to guarantee that the node can transmit a predetermined amount of data or message size in a fixed or predetermined time period. Examples of shared bandwidth data bus include, but are not limited to, IEEE-1394a or b and shared bandwidth versions of Ethernet.

Figure 1:
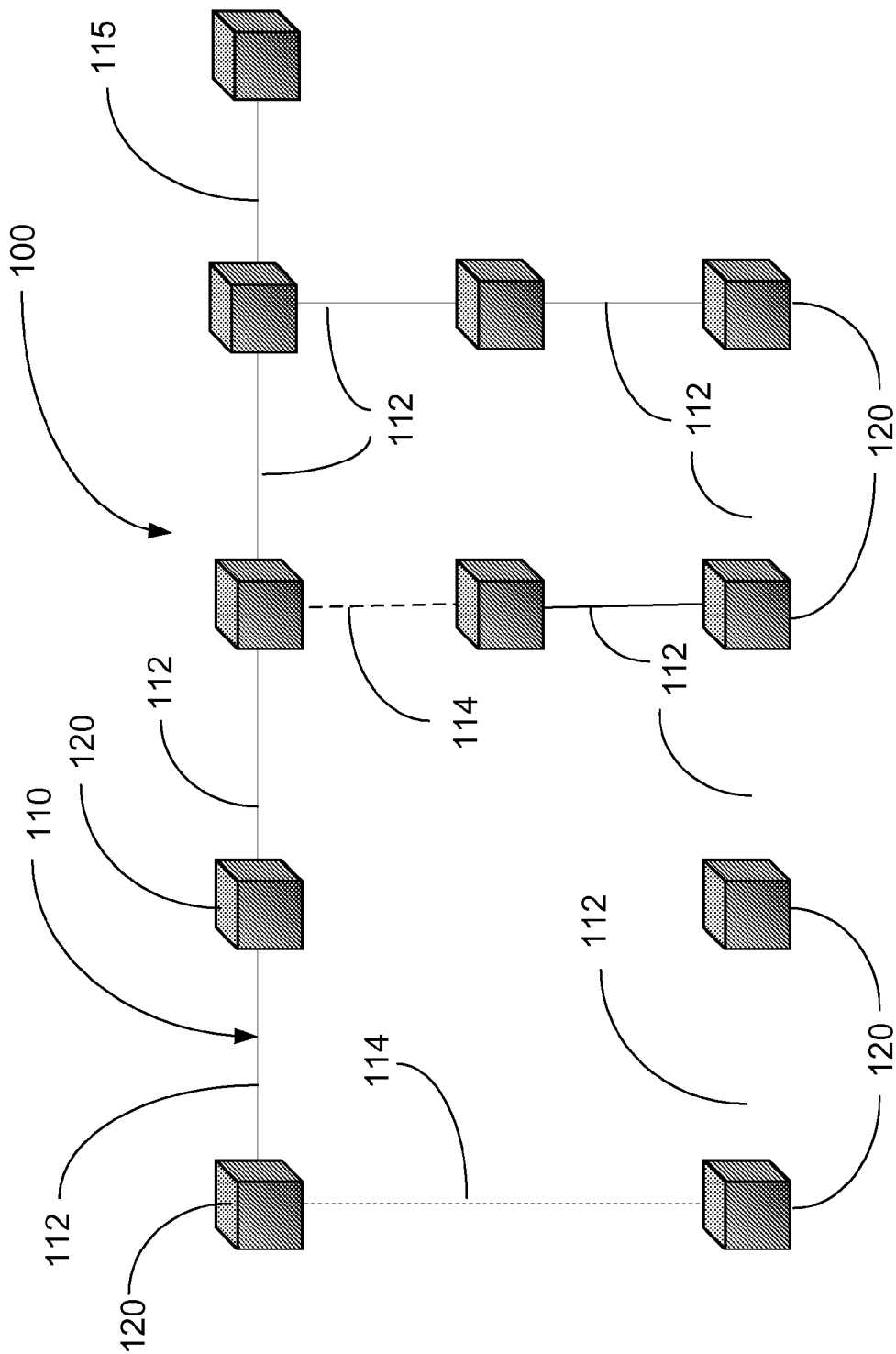
FIG. 1 illustrates a shared bus network in accordance with one embodiment.
Figure 2:
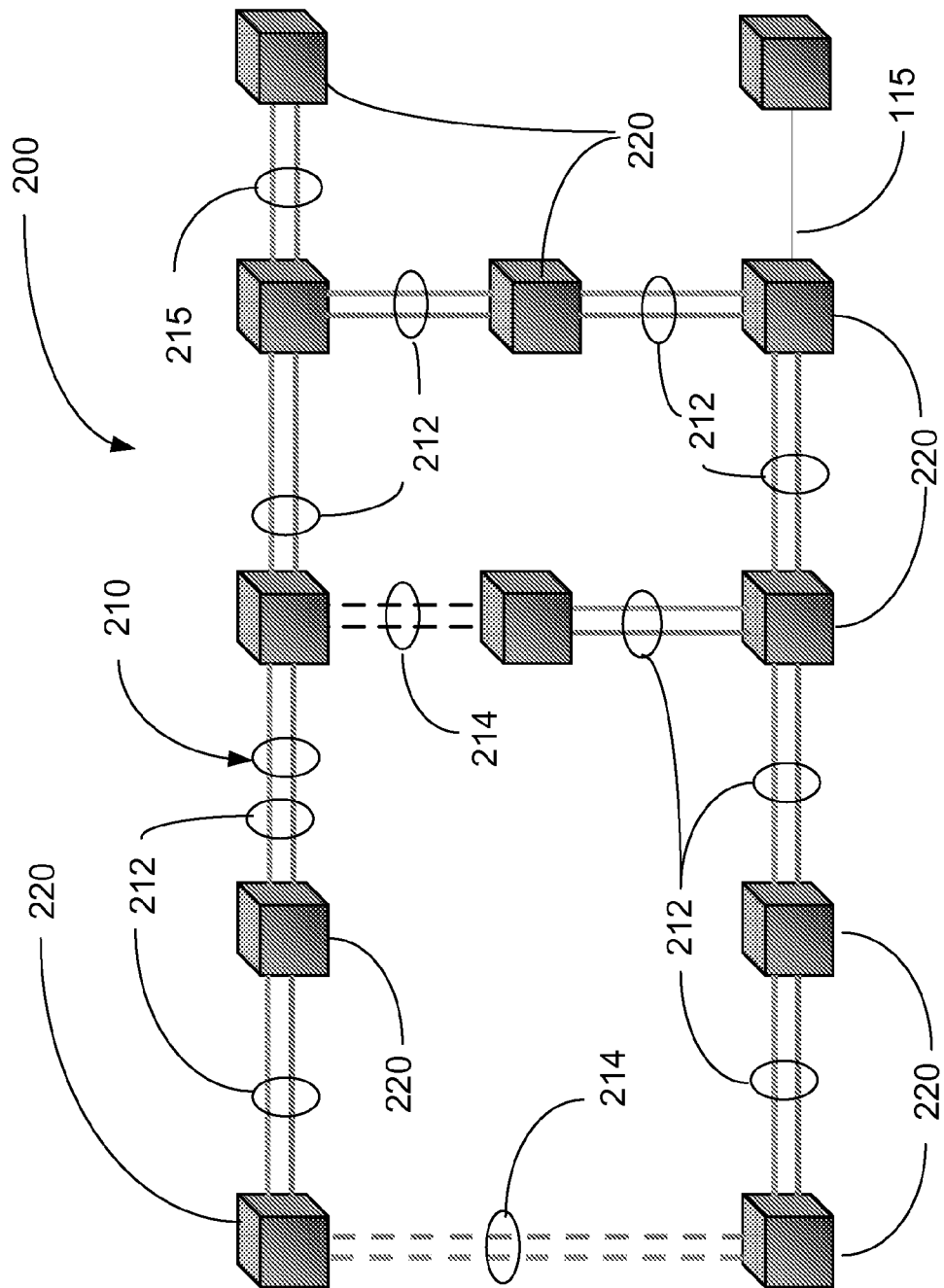
FIG. 2 illustrates a dual shared bus network in accordance with another embodiment.

FIGS. 1 and 2 provide two examples of shared bus networks. The embodiment in FIG. 1 illustrates a shared bus network 100. In this network 100, a single shared bus 110 connects nodes 120. Shared bus 110 may be formed by active links 112 that connect the nodes 120. Some embodiments may include an inactive link 114. Inactive link 114 may be a physical link that is turned off or inactivated at one or both of the connecting nodes 120. In the event a fault in one of the active links 112 or at one of the nodes 120 causes a break and/or degradation in the shared bus 110, then the damaged or degraded active link 112 or node 120 could be deactivated and one of the inactive links 114 could be activated or turned on to return the network 100 to full operation. Thus, the use of inactive links 114 may improve the reliability of network 100. Branch link 115 may be used to connect one or more nodes 120 to network 110 that do not require the improved reliability/redundancy provided by inactive links 114.

The embodiment in FIG. 2 illustrates a shared dual bus network 200 representing a minimum of dual-redundant fault capability, similar to the dual-fault tolerant capability of ARINC 664. In this network, a dual shared bus 210 connects nodes 220. Dual shared bus 210 may be formed by dual active links 212 that connect the nodes 220 and in some embodiments may include dual inactive links 214. One or more of the redundant links 214 may be physical links that are turned off or inactivated at one or both of the connecting nodes 220. In the event a fault in one or more of the links forming dual active link 212 or at one of the nodes 220 causes a break and/or degradation in the dual redundant shared bus 210, then the damaged or degraded active link 212 could be deactivated and one or more dual inactive links 214 or one of the links forming the dual inactive link 214 could be activated or turned on to return the network 200 to full operation. Thus, the use of one or more dual inactive links 214 may improve the reliability of network 200.

As also illustrated in FIGS. 1 and 2 the shape of network 100 or 200 may be a ring, a line, a line with branches, or a combination. This flexibility in network topology of shared buss networks contributes to minimizing the wire weight of the network cables or wires used to form the network links since each node may be connected to the closest node.

FIG. 2 further illustrates a dual branch link 215 that may be used to connect one or more nodes 220 to network 210 that do not require the improved reliability/redundancy provided by dual inactive links 214. FIG. 2 also illustrates an embodiment where single branch link 115 is connected to a node 220 that is also connected to dual active links 212. Thus, if one or more nodes in a network do not require the redundancy of a dual shared bus 210, then these nodes may be connected with a single shared bandwidth bus 110.

Figure 3:
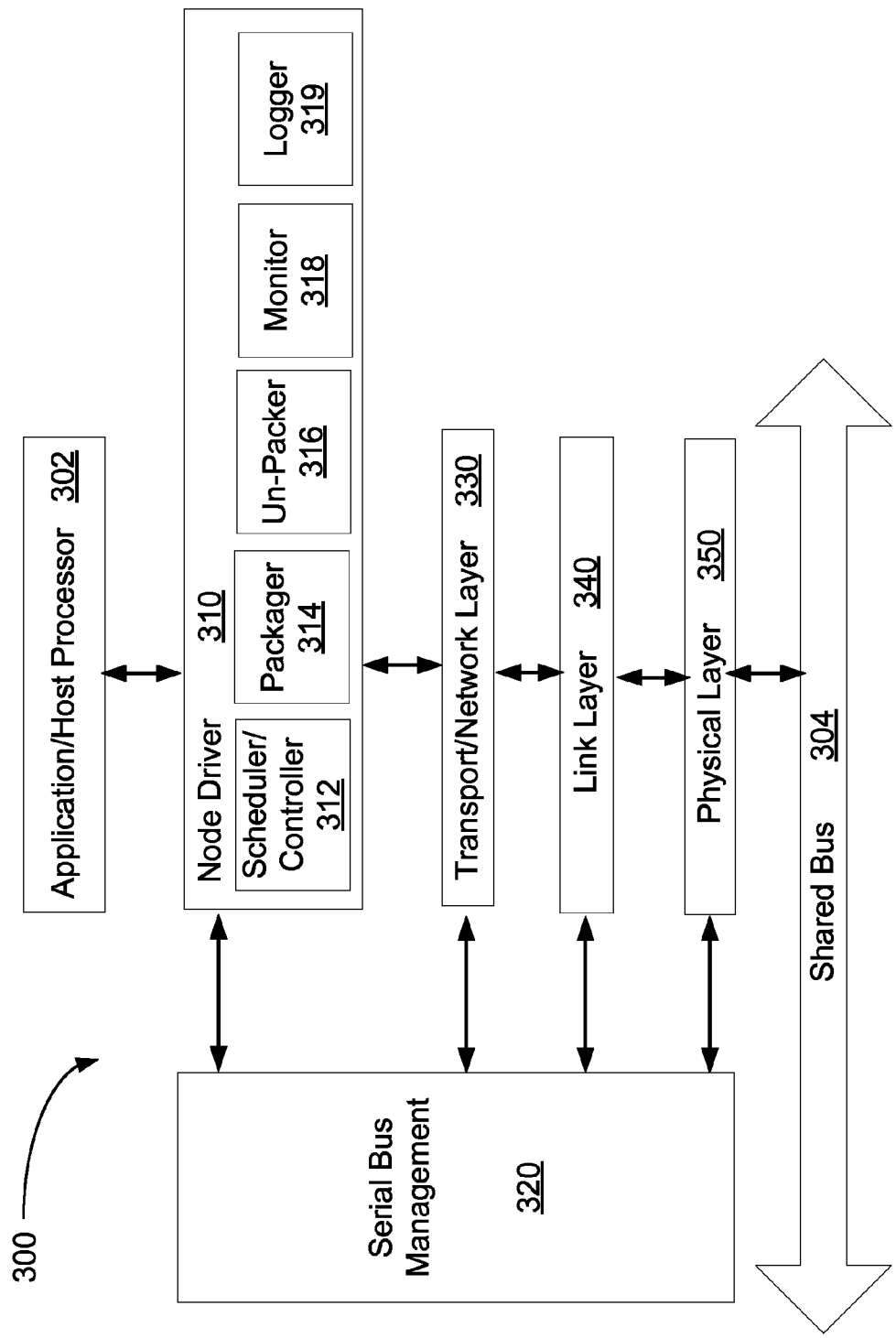
FIG. 3 illustrates one embodiment of an interface between a shared bus network and a host application/processor.

FIG. 3 illustrates one embodiment of an interface 300 between an application 302 running on a node (shown in FIG. 1 at reference numeral 120 or FIG. 2 at reference numeral 220) and the shared bus 304. The shared bus may be a single shared bus 110 or a dual shared bus 210. In some embodiments, a single interface 300 may service both shared buses of a dual shared bus network. In other embodiments, there may be an interface 300 for each shared bus of a dual shared bus network.

The interface 300 includes a node driver 310 (or deterministic transport layer). In some embodiments, node driver 310 serves as an interface between the application/host processor 302, and the serial bus management 320 and the transport/network layer 330. In other embodiments, the node driver 310 may interface between the application/host processor 302, and the serial the transport/network layer 330, the link layer 340 and the physical layer 350.

Figure 4:
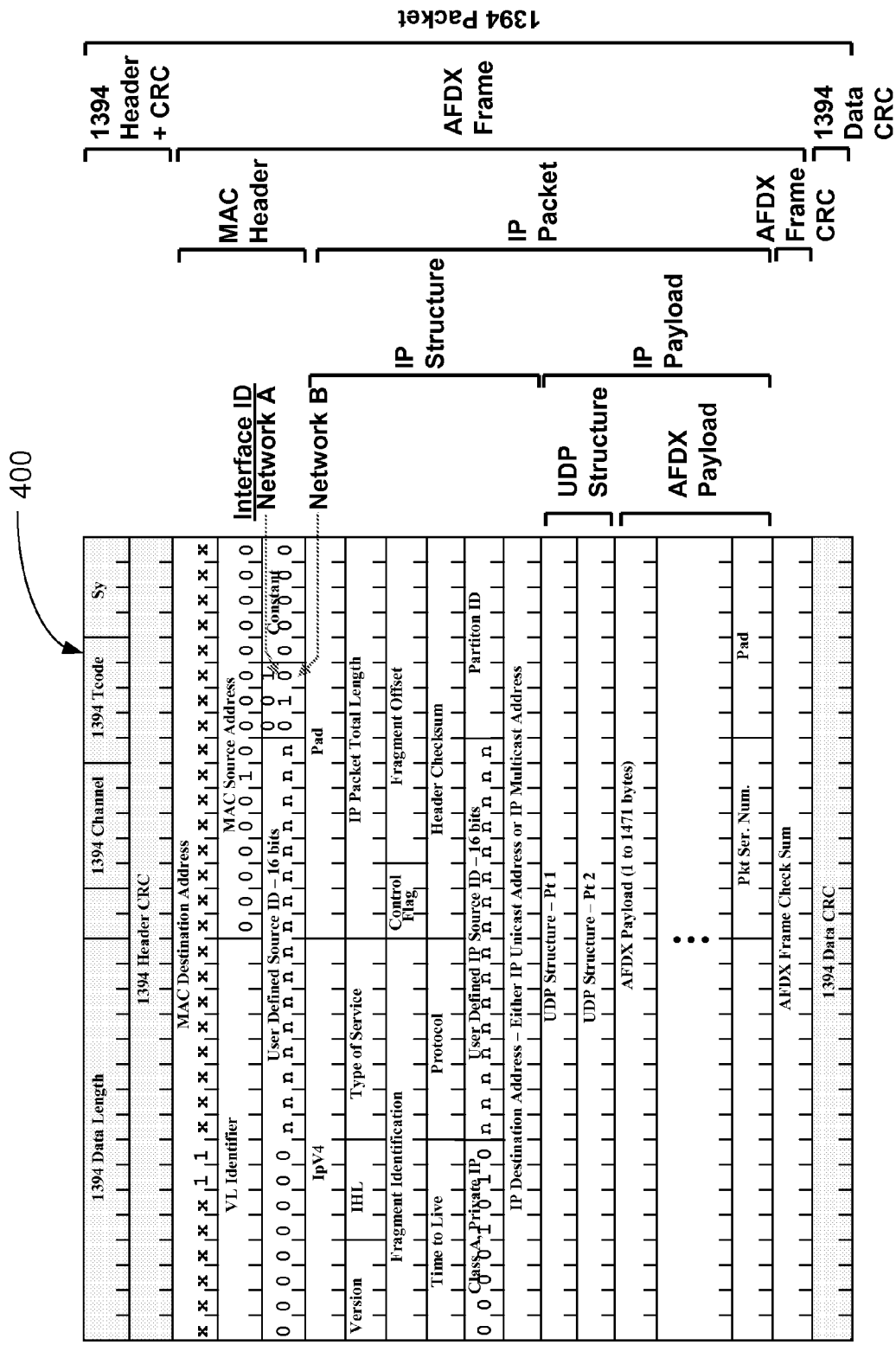
FIG. 4 illustrates an exemplary shared bus packet.

The node driver 310 may package the data or message provided by the application for transmission over the shared bus 304 using packager 314. In some embodiments the node driver 310 may package an ARINC 664 message for transmission over an IEEE 1394 bus. FIG. 4 illustrates an example of packaging an ARINC 664 message for transport over an IEEE 1394 bus. Other embodiments may package other message types or data for transmission over other buses.

In some embodiments the node driver 310 may assign or know the channel assignments of each device attached to the shared bus 304. In other embodiments, the serial bus manager 320, if used, may assign or know the channel assignments of each device attached to the shared bus 304. In further embodiments, the node driver 310 or serial bus manager, as desired, may use network address or other identification schemes to uniquely identify nodes or devices on the network.

Upon receipt of network traffic addressed to the node, the node driver 310 may un-pack the network traffic from the message format used by the network and forward the data to the proper application on the node using un-packer 316. In an embodiment using the IEEE 1394b bus, the node driver un-packer 316 removes the IEEE 1394 header, CRC and any pad data bits. The remaining data is passed to the node host for processing. In an embodiment using ARINC 664 messaging, this processing would be normal ARINC 664 processing.

The node driver 310 typically provides traffic control, scheduling, policing and/or shaping of traffic being transmitted by the node in accordance with the node's bandwidth allocation in order to maintain a deterministic network by controlling the maximum transmission delay. In some embodiments, the traffic control, policing and/or shaping of traffic functions that are implemented by the switches in ARINC 664 may be implemented, in part, in the node drivers at one of the transport, network, link, or physical layer. In other embodiments the traffic control, policing and/or shaping of traffic functions may be implemented at the node driver at the Application Program Interface (API) level.

In some embodiments, the scheduling and traffic shaping may be accomplished with the combination of two functional capabilities: 1) the scheduling for message transmission of individual message packets from each source node in accordance with bandwidth allocations made to each node, and 2) the use of a prioritization methodology for each source node to request access to the physical layer bus. In some embodiments, the first functional capability may be implemented at the API scheduler/controller level of the software driver. This scheduling may, in one embodiment, use the API level message scheduling functionality of the deterministic scheduling algorithms and flow control protocols developed for the switched network of the ARINC 664-Part 7. In other embodiments, the first functional capability may be implemented at other levels of the software driver.

The second functional capability (bus access prioritization at the physical layer), in one embodiment, is implemented by the IEEE-1394b BOSS bus access grant protocol with its multiple levels of priority to allow bus access in accordance with the requested message urgency provided by each node requesting bus access. The prioritization assignment created by this second functional capability may be accomplished by each requesting node based on the urgency its queued messages. In some embodiments, the priority of a node requesting bus access is determined in accordance with the ARINC 664 Bandwidth Allocation Group (BAG) scheduling at the API software driver level. Each node self-assigns its own priority based on its queued messages awaiting transmission. Nodes with the lowest time period BAG groups (e.g., 1 mSec, 2 mSec, etc.) queued are assigned the highest priority. Those nodes with only messages at longer BAG times (e.g., 512 mSec, 1024 mSec) receive the lowest prioritization rankings. These priority levels are relayed to the BOSS arbitrator of the IEEE 1394b network during the pre-negotiation period awaiting the next bus access. Up to five priority levels are available over which to schedule normal node message traffic, which includes the 11 BAG groups available with a native ARINC 664 bus. Employing such scheduling at the physical layer bus access insures that each node gets access to the bus with a latency proportional to it's queued message BAG interval sizes.

Alternatively, node driver 310 may use other methods to control the maximum transmission delay and maintain a deterministic network. Other methods might employ a separate bus type (e.g., a CAN bus, RS-422, or TTP/C, etc.) to relay prioritization information to the node that grants next access to the bus, thereby allowing the use of another bus type for the physical layer that does not employ a built-in prioritization methodology as does IEEE-1394b. In some embodiments, the node driver 310 may also monitor the health of the network traffic and bus performance logging.

As further shown in FIG. 3, the interface 300 may also include serial bus management 320. Buses other than IEEE 1394b may have pre-existing serial bus management 320. In embodiments with pre-existing serial bus management 320, the driver 310 may work with or control the pre-existing serial bus management 320 to provide deterministic data transmission over the network. In contrast, other shared buses may not have pre-existing serial bus management 320. When the shared bus does not have a pre-existing serial bus management 320, then driver 310 may need to provide some of the bus management functions typically provided by a serial bus manager in addition to the bus control needed to provide deterministic data transmission over the network. In some embodiments, these bus management functions could be provided by the scheduler/controller 312. In other embodiments, the bus management functions may be provided by a separate bus manager (not shown) that may be part of the node driver 310.

The IEEE 1394b "asynchronous stream" message type has advantages in some embodiments due to its ability to deliver, when appropriately scheduled, a guaranteed amount of bandwidth to its allocated source node and its authority to transmit its data anywhere within the repeating 125 uSec cycle. In contrast, other message types have certain disadvantages. For instance, the isochronous message type is restricted to bus access by specification to the first 80% (100 uSec) of each repeating 125 uSec cycle, and the regular asynchronous message type requires individual addressing to each recipient node and solicits a delivery acknowledgment from each such recipient.

A further advantage of using IEEE-1394b for the implementation of a deterministic network described by this disclosure is that, for some embodiments, video data service may be provided simultaneously with the other deterministic message traffic. This may be accomplished by the use of either of two methods. The first is the use of the isochronous message type of IEEE-1394b, which was designed into IEEE-1394b specifically to handle the requirements of such data types. The second method is to introduce into the implementation a shorter Bus Allocation Group (BAG) size of the ARINC-664 variety, e.g., of size 0.125 mSec, which is the same size as the IEEE-1394 bus basic repeating cycle, and is eight (8) times shorter (more frequent) than the shortest BAG interval in native ARINC 664.

Both switched and shared bandwidth networks have their advantages and disadvantages. Latency is the essential feature for determinism, and is primarily determined by available bandwidth, which can be provided by either bus type. Where bandwidth bottlenecks show up is, however, different. Switched networks may manifest bottlenecks differently than shared bandwidth buses.

For instance, the ARINC 664 switches are required by specification to accept the full data rate from all nodes without limit, but must buffer up the output ports (up to 500 packets for each output port) to the end destinations to handle cases when multiple sources are trying to send data to any one destination output port. Conversely for a shared bandwidth bus, a node accessing a shared bandwidth bus might have to wait to get on to the bus, but once on the bus, the data is passed without any further delay to its intended destination. So, the bottleneck, or latency delay, would be introduced at the sending node instead.

As long as the guaranteed bandwidth is available to each transmitting port, the bottleneck on the front end should be no worse than the bottleneck on the back end. However, 1394b may be able to provide better latency services because of its capability to regulate bus accesses with 5 priority levels, which may be used by the designer to insure that the most urgent node, from a latency standpoint, gets access to the shared bandwidth bus every time that the bus becomes available.

In summary, numerous benefits are described which result from employing embodiments of the disclosure. The foregoing description of an exemplary embodiment is presented for the purposes of illustration and description. It is not intended to be exhaustive or to limit the embodiments to the precise form disclosed. Obvious modifications or variations are possible in light of the above teachings. Each embodiment was selected and described in order to best illustrate the principles of the disclosure and its practical application to thereby enable one of ordinary skill in the art to best utilize the various embodiments with or without various modifications as are suited to particular uses contemplated. It is intended that the scope of the disclosure be defined by the claims appended hereto.

I claim:

1. A switchless deterministic data bus network, the network comprising:
   a dual switchless shared bandwidth data bus;
   at least three nodes in communication with the dual switchless shared bandwidth data bus; and
   an interface between an application executing on a node of the at least three nodes and the shared bandwidth bus, wherein the interface comprises a node driver associated with at least one of the nodes to provide message scheduling, prioritization, and flow control, the message scheduling using a bandwidth allocation protocol for scheduling message packets, wherein the node driver translates between a switchless networking protocol native to the dual switchless shared bandwidth bus and a protocol compatible with the Aeronautical Radio, Incorporated (ARINC) 664 protocol to provide a deterministic data transfer service to the application executing on the node.

2. The network of claim 1 wherein:
   the network further comprises at least one separate bus between the at least three nodes in the network; and
   a first network node transmits prioritization information to a second network node which is scheduled to grant access to the shared bandwidth data bus immediately following the first network node.

3. The network of claim 1 wherein the node driver further comprises a serial bus manager, wherein the serial bus manager maintains an identifier for each device on the data bus channel and channel assignments for each device attached to the data bus.

4. The network of claim 1 wherein said bandwidth allocation protocol assigns bus access requests into one or more bandwidth allocation groups based on a required transmission time associated with the request, and wherein the network further comprises an arbitration module to arbitrate between competing access requests from multiple nodes on the network.

5. The network of claim 1 wherein each data bus of the shared bandwidth data bus is an IEEE 1394b data bus, and wherein prioritization for message access to the physical bus is communicated and implemented via the IEEE 1394b data bus and its associated BOSS protocol.

6. The network of claim 1 wherein said bandwidth allocation protocol is based on an a priori model of node traffic.

7. The network of claim 1 wherein said plurality of nodes are configured in at least one of a tree topology or a loop topology.

8. The network of claim 1 wherein said node driver comprises:
   a scheduler to schedule traffic on the shared data bus;
   a packager to package data for transmission on the shared data bus; and
   an unpacker to unpack data received on the shared data bus.

9. A switchless deterministic data bus network, the network comprising:
   a dual switchless shared bandwidth data bus;
   at least three nodes in communication with said switchless shared bandwidth data bus; and
   an interface between an application executing on a node of the at least three nodes and the shared bandwidth bus, wherein the interface comprises a node driver associated with at least one of the nodes to provide message scheduling, prioritization, and flow control, the message scheduling using a bandwidth allocation protocol for scheduling message packets, wherein the node driver translates between a switchless networking protocol native to the dual switchless shared bandwidth bus and a protocol compatible with the Aeronautical Radio, Incorporated (ARINC) 664 protocol to provide a deterministic data transfer service to the application executing on the node.

10. The network of claim 9 wherein the switchless shared bandwidth data bus is a dual switchless shared bandwidth data bus.

11. The network of claim 9 wherein:
the network further comprises at least one separate bus between the at least three nodes in the network; and
a first network node transmits prioritization information to a second network node which is scheduled to grant access to the shared bandwidth data bus immediately following the first network node.

12. The network of claim 9 wherein said bandwidth allocation protocol comprises assigning a unique channel number to each of said plurality of nodes.

13. The network of claim 9 wherein said bandwidth allocation protocol assigns bus access requests into one or more bandwidth allocation groups based on a required transmission time associated with the request, and wherein the network further comprises an arbitration module to arbitrate between competing access requests from multiple nodes on the network.

14. The network of claim 9, wherein the shared bandwidth data bus is an IEEE 1394b data bus and wherein prioritization for message access to the physical bus is communicated and implemented via the IEEE 1394b data bus and its associated BOSS protocol.

15. The network of claim 9 wherein said bandwidth allocation protocol is based on an a priori model of node traffic.

16. The network of claim 9 wherein said at least three nodes are configured in at least one of a tree topology or a loop topology.

17. The network of claim 9 wherein said node driver comprises:
a scheduler to schedule traffic on the shared data bus;
a packager to package data for transmission on the shared data bus; and
an unpacker to unpack data received on the shared data bus.

18. An interface between a host processor and a switchless shared bandwidth network comprising at least three network nodes, comprising:
a packager configured to package data received from the host processor into packets compatible with the switchless shared bandwidth network;
an un-packager configured to un-package data packets received from the switchless shared bandwidth network, remove payload data destined for the host processor, and transmit the payload data to the host processor; and
an interface between an application executing on a node of the at least three nodes and the shared bandwidth bus, wherein the interface comprises a node driver associated with at least one of the nodes to provide message scheduling, prioritization, and flow control, the message scheduling using a bandwidth allocation protocol for scheduling message packets, wherein the node driver translates between a switchless networking protocol native to the dual switchless shared bandwidth bus and a protocol compatible with the Aeronautical Radio, Incorporated (ARINC) 664 protocol.

19. The interface of claim 18, wherein:
at least one separate bus between the at least three nodes in the network; and
a first network node transmits prioritization information to a second network node which is scheduled to grant access to the shared bandwidth data bus immediately following the first network node.

20. The interface of claim 19, wherein the serial bus manager comprises a IEEE 1394b BOSS physical layer access protocol.

21. The interface of claim 18, wherein the serial bus manager employs the isochronous message type of the native IEEE-1394 data bus to service video data.

22. The interface of claim 18, wherein the deterministic bus schedule and control module uses ARINC 664 deterministic message scheduling technique and Bandwidth Allocation Group (BAG) method of bandwidth allocation.

23. The interface of claim 22, wherein the BAG includes a plurality of BAG group interval sizes, wherein at least one of the plurality of BAG groups is native to ARINC-664 and wherein at least one of the plurality of BAG groups is not native to ARINC-664 and is used to service video data.

* * * * *